Nov. 17, 1942.  F. J. MARKEY  2,302,451
BRAKE LINING WEAR INDICATOR
Filed Jan. 6, 1941
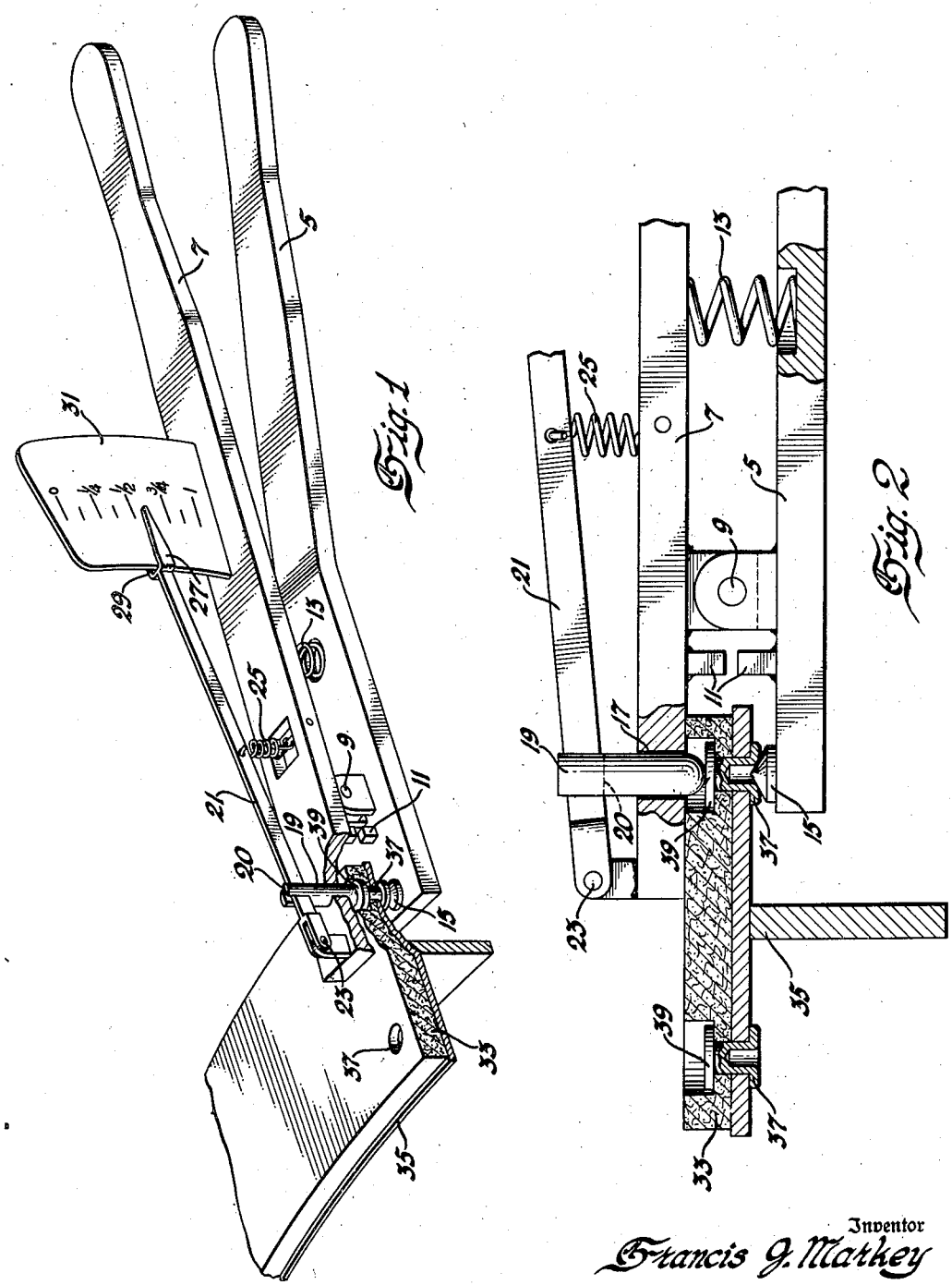
Inventor
Francis J. Markey
By
Blackmor, Spencer & Flint
Attorneys Patented Nov. 17, 1942

2,302,451

UNITED STATES PATENT OFFICE 2,302,451

BRAKE LINING WEAR INDICATOR

Francis J. Markey, Lewisburg, Ohio, assignor to General Motors Corporation, Detroit, Mich., a corporation of Delaware Application January 6, 1941, Serial No. 373,207

1 Claim. (Cl. 33—172)

This invention relates to an indicator to show the extent of brake lining wear.

An object of the invention is to provide means to visibly indicate the thickness of brake lining above the rivet heads and, in the case of new lining, to determine if the lining is properly counterbored.

Other uses of the indicator will be apparent when its use for the purpose stated has been explained.

In the drawing:

Figure 1 is a perspective of the indicator.

Figure 2 is a view in elevation, partly in section.

Referring to the figures of the drawing, numerals 5 and 7 represent two levers pivoted together at 9. Numeral 11 represents stops adapted to engage when the short arms approach under the influence of a spring 13 located between the long arms. At the end of lever 5 is a cone shaped anvil 15. Lever 7 has a through opening 17 above the anvil. Slidable through opening 17 is a depth-rod 19. The rod 19 is rounded on its lower end and its upper end is bifurcated as at 20 to straddle an arm 21. The arm 21 is pivoted at 23 to lever 7 and is drawn toward lever 7 by a spring 25 as shown. The end of the arm is bifurcated to form pointers 27 and 29, one on each side of a plate 31 suitably secured to the upper face of lever 7. Graduations are marked on the faces of the plate as shown. The graduations may read from 0 to 1 with fraction indicia between the limiting marks.

The usable portion of brake lining 33, which is secured to brake shoes 35 by rivets 37, is the thickness between the rivet heads 39 and the unattached surface of the lining. As the lining wears in service the unattached surface approaches the rivet heads. When worn down so that the rivet heads are exposed the shoe requires new lining to avoid faulty braking and damage to the drum. The indicator scale is so formed that the pointer is directed to 0 when the lining is worn down to the rivet heads, and to 1 when the lining is new. The indicator is used by pressing together the long arms of levers 5 and 7 and locating the anvil cone at the rivet end as shown. Spring 13 then acts to bring the short arms toward each other with the lower face of lever 7 engaging the unattached surface of the lining 33. In doing so the depth rod, in contact with the rivet head, pushes the arm 21 upwardly to an extent measured by the thickness of the lining above the rivet head acting, in doing so, against spring 25. It will be seen that the pointer should read 1 for an unworn lining with a properly counterbored rivet opening, and that it should read 0 for a lining worn down to the rivets.

In some brakes the linings for the forward and rearward shoes differ. For this purpose the arm has been made with a second pointer 29 and the scale for this second pointer may be on the reverse side of plate 31 and may be given similar limits, 1 and 0, and intermediate graduations, but made to correspond with the second lining.

Another use to which the indicator may be put is to test new shoes. The lining may be not properly counterbored. The rivet head may be too high to give the desired thickness for wear or it may be too low to properly fasten the lining to the shoe. Obviously such error may be quickly determined by use of the indicator. It will be appreciated, also, that additional scales may be provided for use in testing linings on shoes other than the ones for which the device is primarily intended.

By reading the amount of useful lining left and checking with the odometer reading an accurate expectancy of future lining life may be determined.

The invention has been described with reference to brakes for use with which it is primarily intended but it will be apparent that it is useful in other relations, in friction clutches for example.

I claim:

An indicator for measuring the usable portion of frictional material secured by rivets to a supporting foundation, said indicator comprising first and second levers pivoted together, each of said levers having a short arm and a long arm, an anvil carried by the short arm of the first lever, the short arm of said second lever having an aperture therethrough in line with said anvil, a rod reciprocable through said aperture, spring means between the long arms of said levers whereby the anvil on the short arm of the first lever may contact a rivet end and the short arm of the second lever may contact the free surface of the lining and the rod may be projected to an extent determined by the thickness of the lining between the free surface and the rivet head together with means to indicate visibly the thickness of the usable lining, said last named means including an arm terminally pivoted to said second lever, a scale carried by said second lever and having first and second limiting marks, said arm terminating in a pointer to register with said scale, spring means operable to bias said pointer toward said first limiting mark whereby said pointer may indicate an unworn lining, said pointer being adapted to register with the second limiting mark when the lining is worn to the rivet.

FRANCIS J. MARKEY.